US006970142B1

(12) United States Patent
Pleva et al.

(10) Patent No.: US 6,970,142 B1
(45) Date of Patent: Nov. 29, 2005

(54) ANTENNA CONFIGURATIONS FOR REDUCED RADAR COMPLEXITY

(75) Inventors: Joseph S. Pleva, Londonderry, NH (US); Michael Joseph Delcheccolo, Westford, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/376,179

(22) Filed: Feb. 27, 2003

Related U.S. Application Data

(63) Continuation-in-part of application No. 10/293,880, filed on Nov. 13, 2002, which is a continuation-in-part of application No. 09/932,574, filed on Aug. 16, 2001, now Pat. No. 6,642,908.

(51) Int. Cl.⁷ .................................. H01Q 3/24
(52) U.S. Cl. ................... 343/876; 343/700 MS; 343/853
(58) Field of Search .................... 343/700 MS, 876, 343/853, 850, 893; H01Q 3/24

(56) References Cited

U.S. PATENT DOCUMENTS

| | | |
|---|---|---|
| 3,697,985 A | 10/1972 | Faris et al. |
| 3,935,559 A | 1/1976 | Straffon et al. |
| 3,940,696 A | 2/1976 | Nagy |
| 3,974,501 A | 8/1976 | Ritzie |
| 3,978,481 A | 8/1976 | Angwin et al. |
| 4,003,049 A | 1/1977 | Sterzer et al. |
| 4,008,473 A | 2/1977 | Hinachi et al. |
| 4,008,475 A | 2/1977 | Johnson |
| 4,035,797 A | 7/1977 | Nagy |
| 4,063,243 A | 12/1977 | Anderson et al. |
| 4,079,377 A | 3/1978 | zur Heiden et al. |
| 4,143,370 A | 3/1979 | Yamanaka et al. |
| 4,209,791 A | 6/1980 | Gerst et al. |
| 4,217,582 A | 8/1980 | Endo et al. |
| 4,246,585 A | 1/1981 | Mailloux |
| 4,308,536 A | 12/1981 | Sims, Jr. et al. |
| 4,348,675 A | 9/1982 | Senzaki et al. |
| 4,349,823 A | 9/1982 | Tagami et al. |
| 4,409,899 A | 10/1983 | Owen et al. |
| 4,414,550 A | 11/1983 | Tresselt |
| 4,507,662 A | 3/1985 | Rothenberg et al. |
| 4,509,056 A | 4/1985 | Fassett |
| 4,543,577 A | 9/1985 | Tachibana et al. |
| 4,549,181 A | 10/1985 | Tachibana et al. |
| 4,622,636 A | 11/1986 | Tachibana |
| 4,673,937 A | 6/1987 | Davis |
| 4,703,429 A | 10/1987 | Sakata |

(Continued)

FOREIGN PATENT DOCUMENTS

DE 196 32 889 2/1998

(Continued)

OTHER PUBLICATIONS

International Search Report of PCT Application No. PCT/US01/25638 dated May 7, 2002.

(Continued)

*Primary Examiner*—Hoanganh Le
(74) *Attorney, Agent, or Firm*—Daly, Crowley, Mofford & Durkee, LLP

(57) ABSTRACT

A transmit and receiving system including a first array including at least one antenna element disposed to provide a transmit antenna. The system further includes a second array having a second different plurality of antenna elements disposed to provide a receive antenna. The first array is coupled to a switching system, which is operative to selectively form at least one transmit beam. The second array is coupled to a beam combining system, which is operative to selectively form a plurality of receive beams.

14 Claims, 12 Drawing Sheets

U.S. PATENT DOCUMENTS

| | | |
|---|---|---|
| 4,718,558 A | 1/1988 | Castaneda |
| 4,901,083 A | 2/1990 | May et al. |
| 4,962,383 A | 10/1990 | Tresselt |
| 4,970,653 A | 11/1990 | Kenue |
| 4,994,809 A | 2/1991 | Yung et al. |
| 5,008,678 A | 4/1991 | Herman |
| 5,014,200 A | 5/1991 | Chundrlik et al. |
| 5,023,617 A | 6/1991 | Deering |
| 5,045,856 A | 9/1991 | Paoletti |
| 5,115,245 A | 5/1992 | Wen et al. |
| 5,132,693 A * | 7/1992 | Werp ......................... 342/179 |
| 5,134,411 A | 7/1992 | Adler |
| 5,138,321 A | 8/1992 | Hammer |
| 5,173,859 A | 12/1992 | Deering |
| 5,189,426 A | 2/1993 | Asbury et al. |
| 5,202,700 A | 4/1993 | Miller |
| 5,235,316 A | 8/1993 | Qualizza |
| 5,249,027 A | 9/1993 | Mathur et al. |
| 5,249,157 A | 9/1993 | Taylor |
| 5,252,981 A | 10/1993 | Grein et al. |
| 5,268,692 A | 12/1993 | Grosch et al. |
| 5,280,288 A | 1/1994 | Sherry et al. |
| 5,285,207 A | 2/1994 | Asbury et al. |
| 5,302,956 A | 4/1994 | Asbury et al. |
| 5,315,303 A | 5/1994 | Tsou et al. |
| 5,325,096 A | 6/1994 | Pakett |
| 5,325,097 A | 6/1994 | Zhang et al. |
| 5,339,075 A | 8/1994 | Abst et al. |
| 5,341,144 A | 8/1994 | Stove |
| 5,351,044 A | 9/1994 | Mathur et al. |
| RE34,773 E | 11/1994 | Dombrowski |
| 5,390,118 A | 2/1995 | Margolis et al. |
| 5,394,292 A | 2/1995 | Hayashida |
| 5,396,252 A | 3/1995 | Kelly |
| 5,400,864 A | 3/1995 | Winner et al. |
| 5,410,745 A | 4/1995 | Friesen et al. |
| 5,414,643 A | 5/1995 | Blackman et al. |
| 5,451,960 A | 9/1995 | Kastella et al. |
| 5,454,442 A | 10/1995 | Labuhn et al. |
| 5,467,072 A | 11/1995 | Michael |
| 5,467,283 A | 11/1995 | Butsuen et al. |
| 5,471,214 A | 11/1995 | Faibish et al. |
| 5,479,173 A | 12/1995 | Yoshioka et al. |
| 5,481,268 A | 1/1996 | Higgins |
| 5,483,453 A | 1/1996 | Uemura et al. |
| 5,485,155 A | 1/1996 | Hibino |
| 5,485,159 A | 1/1996 | Zhang et al. |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,511,719 A | 4/1996 | Miyake et al. |
| 5,517,196 A | 5/1996 | Pakett et al. |
| 5,521,579 A | 5/1996 | Bernhard |
| 5,530,447 A | 6/1996 | Henderson et al. |
| 5,572,428 A | 11/1996 | Ishida et al. |
| 5,583,495 A | 12/1996 | Ben Lulu |
| 5,587,908 A | 12/1996 | Kajiwara |
| 5,613,039 A | 3/1997 | Wang et al. |
| 5,619,208 A | 4/1997 | Tamatsu et al. |
| 5,625,362 A | 4/1997 | Richardson |
| 5,627,510 A | 5/1997 | Yuan |
| 5,633,642 A | 5/1997 | Hoss et al. |
| 5,654,715 A | 8/1997 | Hayashikura et al. |
| 5,670,963 A | 9/1997 | Kubota et al. |
| 5,675,345 A | 10/1997 | Pozgay et al. |
| 5,678,650 A | 10/1997 | Ishihara et al. |
| 5,689,264 A | 11/1997 | Ishikawa et al. |
| 5,712,640 A | 1/1998 | Andou et al. |
| 5,715,044 A | 2/1998 | Hayes |
| 5,717,399 A | 2/1998 | Urabe et al. |
| 5,719,580 A | 2/1998 | Core |
| 5,731,778 A | 3/1998 | Nakatani et al. |
| 5,734,344 A | 3/1998 | Yamada |
| 5,757,074 A | 5/1998 | Matloubian et al. |
| 5,757,307 A | 5/1998 | Nakatani et al. |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,808,561 A | 9/1998 | Kinoshita et al. |
| 5,808,728 A | 9/1998 | Uehara |
| 5,812,083 A | 9/1998 | Johnson et al. |
| 5,818,355 A | 10/1998 | Shirai et al. |
| 5,839,534 A | 11/1998 | Chakraborty et al. |
| 5,905,472 A | 5/1999 | Wolfson et al. |
| 5,923,280 A | 7/1999 | Farmer |
| 5,926,126 A | 7/1999 | Engelman |
| 5,929,802 A | 7/1999 | Russell et al. |
| 5,938,714 A | 8/1999 | Satonaka |
| 5,940,011 A | 8/1999 | Agravante et al. |
| 5,949,365 A | 9/1999 | Wagner |
| 5,949,366 A | 9/1999 | Herrmann |
| 5,959,570 A | 9/1999 | Russell |
| 5,977,904 A | 11/1999 | Mizuno et al. |
| 5,978,736 A | 11/1999 | Greendale |
| 5,999,092 A | 12/1999 | Smith et al. |
| 5,999,119 A | 12/1999 | Carnes et al. |
| 5,999,874 A | 12/1999 | Winner et al. |
| 6,011,507 A | 1/2000 | Curran et al. |
| 6,018,308 A | 1/2000 | Shirai |
| 6,026,347 A | 2/2000 | Schuster |
| 6,026,353 A | 2/2000 | Winner |
| 6,028,548 A | 2/2000 | Farmer |
| 6,037,860 A | 3/2000 | Zander et al. |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,049,257 A | 4/2000 | Hauk |
| 6,057,797 A | 5/2000 | Wagner |
| 6,069,581 A | 5/2000 | Bell et al. |
| 6,070,682 A | 6/2000 | Iaogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,091,355 A | 7/2000 | Cadotte, Jr. et al. |
| 6,097,331 A | 8/2000 | Matsugatani et al. |
| 6,097,931 A | 8/2000 | Weiss et al. |
| 6,104,336 A | 8/2000 | Curran et al. |
| 6,107,956 A | 8/2000 | Russell et al. |
| 6,114,985 A | 9/2000 | Russell et al. |
| 6,127,965 A | 10/2000 | McDade et al. |
| 6,130,607 A | 10/2000 | McClanahan et al. |
| 6,137,434 A | 10/2000 | Tohya et al. |
| 6,147,637 A | 11/2000 | Morikawa et al. |
| 6,147,638 A | 11/2000 | Rohling et al. |
| 6,154,168 A | 11/2000 | Egawa et al. |
| 6,160,514 A * | 12/2000 | Judd .................... 343/700 MS |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,198,434 B1 | 3/2001 | Martek et al. |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,252,560 B1 | 6/2001 | Tanaka et al. |
| 6,255,984 B1 | 7/2001 | Kreppold et al. |
| 6,256,573 B1 | 7/2001 | Higashimata |
| 6,259,495 B1 | 7/2001 | Adachi et al. |
| 6,265,990 B1 | 7/2001 | Isogai et al. |

| | | | |
|---|---|---|---|
| 6,268,793 B1 | 7/2001 | Rossi | |
| 6,269,298 B1 | 7/2001 | Seto | |
| 6,278,400 B1 | 8/2001 | Cassen et al. | |
| 6,297,732 B2 | 10/2001 | Hsu et al. | |
| 6,307,622 B1 | 10/2001 | Lewis | |
| 6,307,882 B1 * | 10/2001 | Marzetta | 375/224 |
| 6,317,073 B1 | 11/2001 | Tamatsu et al. | |
| 6,317,075 B1 | 11/2001 | Heide et al. | |
| 6,317,090 B1 | 11/2001 | Nagy et al. | |
| 6,320,547 B1 | 11/2001 | Fathy et al. | |
| 6,327,530 B1 | 12/2001 | Nishimura et al. | |
| 6,329,952 B1 | 12/2001 | Grace | |
| 6,330,507 B1 | 12/2001 | Adachi et al. | |
| 6,335,705 B1 | 1/2002 | Grace et al. | |
| 6,339,369 B1 | 1/2002 | Paranjpe | |
| 6,345,227 B1 | 2/2002 | Egawa et al. | |
| 6,351,702 B1 | 2/2002 | Tange et al. | |
| 6,366,235 B1 | 4/2002 | Mayer et al. | |
| 6,414,631 B1 | 7/2002 | Fujimoto | |
| 6,463,303 B1 * | 10/2002 | Zhao | 455/562.1 |
| 6,642,908 B2 * | 11/2003 | Pleva et al. | 343/876 |
| 6,674,394 B1 | 1/2004 | Zoratti | |
| 6,680,689 B1 | 1/2004 | Zoratti | |
| 2002/0163478 A1 | 11/2002 | Pleva et al. | |

FOREIGN PATENT DOCUMENTS

| | | |
|---|---|---|
| DE | 195 23 693 | 5/1998 |
| DE | 198 55 400 | 12/1998 |
| DE | 198 50 128 | 5/1999 |
| EP | 0 398 712 | 5/1990 |
| EP | 0 398 555 | 11/1990 |
| EP | 0 484 995 | 5/1992 |
| EP | 0 642 190 A1 | 12/1993 |
| EP | 0 668 627 | 8/1995 |
| EP | 0 784 213 | 1/1996 |
| EP | 0 883 208 | 9/1998 |
| EP | 0 887 658 | 12/1998 |
| EP | 0 932 052 | 7/1999 |
| EP | 0 978 729 A2 | 2/2000 |
| EP | 0 982 173 | 3/2000 |
| EP | 1 020 989 | 7/2000 |
| FR | 2 709 834 | 9/1993 |
| GB | 1 143 997 | 2/1969 |
| GB | 2 315 644 | 2/1998 |
| JP | 2000-114866 | 4/2000 |

OTHER PUBLICATIONS

Partial International Search Report of PCT Application No. PCT/US01/25642 dated May 27, 2002.

International Search Report of PCT Application No. PCT/US01/42065 dated May 14, 2002.

International Search Report of PCT Application No. PCT/US01/25594 dated May 7, 2002.

G.S. Dow, et al. "Monolithic Receivers with Integrated Temperature Compensation Function", IEEE GaAs IC Symposium, 1991, pp. 267-269.

International Search Report of PCT Application No. PCT/US01/25682 dated May 14, 2002.

Sangster, Alan et al. "A Moment Method Analysis of a Transverse Slot Fed by a Boxed Stripline", (No Date) pp. 146-149.

Schaubert, Daniel H. et al. "Moment Method Analysis of Infinite Stripline-Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground-Plane of Enclosed Stripline", 10th International Conference on Antennas and Propagation 14.17, Apr. 1997, 5 pages.

Theron, Isak Petrus et al. "On Slotted Waveguide Antenna Design at Ka-Band", IEEE Trans. vol. 32, Oct. 1984, pp. 1425-1426.

International Search Report of PCT Application No. PCT/US01/25676 dated Dec. 21, 2001.

International Search Report of PCT Application No. PCT/US01/25677 dated Apr. 17, 2002.

Barnett, Roy I. et al, "A Feasibility Study of Stripline-Fed Slots Arranged as a Planar Array with Circular Grid and Circular Boundary", IEEE, 1989, pp. 1510-1515.

Bhattacharyya, Arum, et al. "Analysis of Stripline-Fed Slot-Coupled Patch Antennas with Vias for Parallel-Plate Mode Suppressioin", IEEE Transactions on Antennas and Propagation, vol. 46, No. 4, Apr. 1998, pp. 538-545.

Clouston E.N. et al. "A Triplate Slot Antenna Developed for Time-Domain Measurements on Phased Arrays", 1998, pp. 312-315.

Das, Nirod K. et al. "Multiport Scattering Analysis of General Multilayered Printed Antennas Fed by Multiple Feed Ports: Part II-Applications", IEEE, 1992, pp. 482-491.

Katehi, Pisti B. et al. "Design of a Low Slidelobe Level Stripline Fed Slot Array Covered by a Dielectric Layer", 1989, pp. 978-981.

Kimura, Yuichi et al. "Alternating Phase Single-Layer Slotted Waveguide Arrays at 25GHz Band", IEEE, 1999, pp. 142-145.

Muir, A., "Analysis of Stripline/Slot Transition", Electronics Letter, vol. 26 No. 15, pp. 1160-1161.

Sakaibara, Kunio et al. "A Single Layer Slotted Waveguide Array for 22GHz Band Radio System Between Mobile Base Stations", IEEE, 1994, pp. 356-359.

PCT Search Report: PCT Application No. PCT/US03/35578; dated Apr. 6, 2004.

EP Search Report; EP Application No. 01/96 5965; dated Aug. 19, 2004.

Supplementary European Search Report: EP Application No. 01/98 5984; dated Nov. 11, 2004.

* cited by examiner

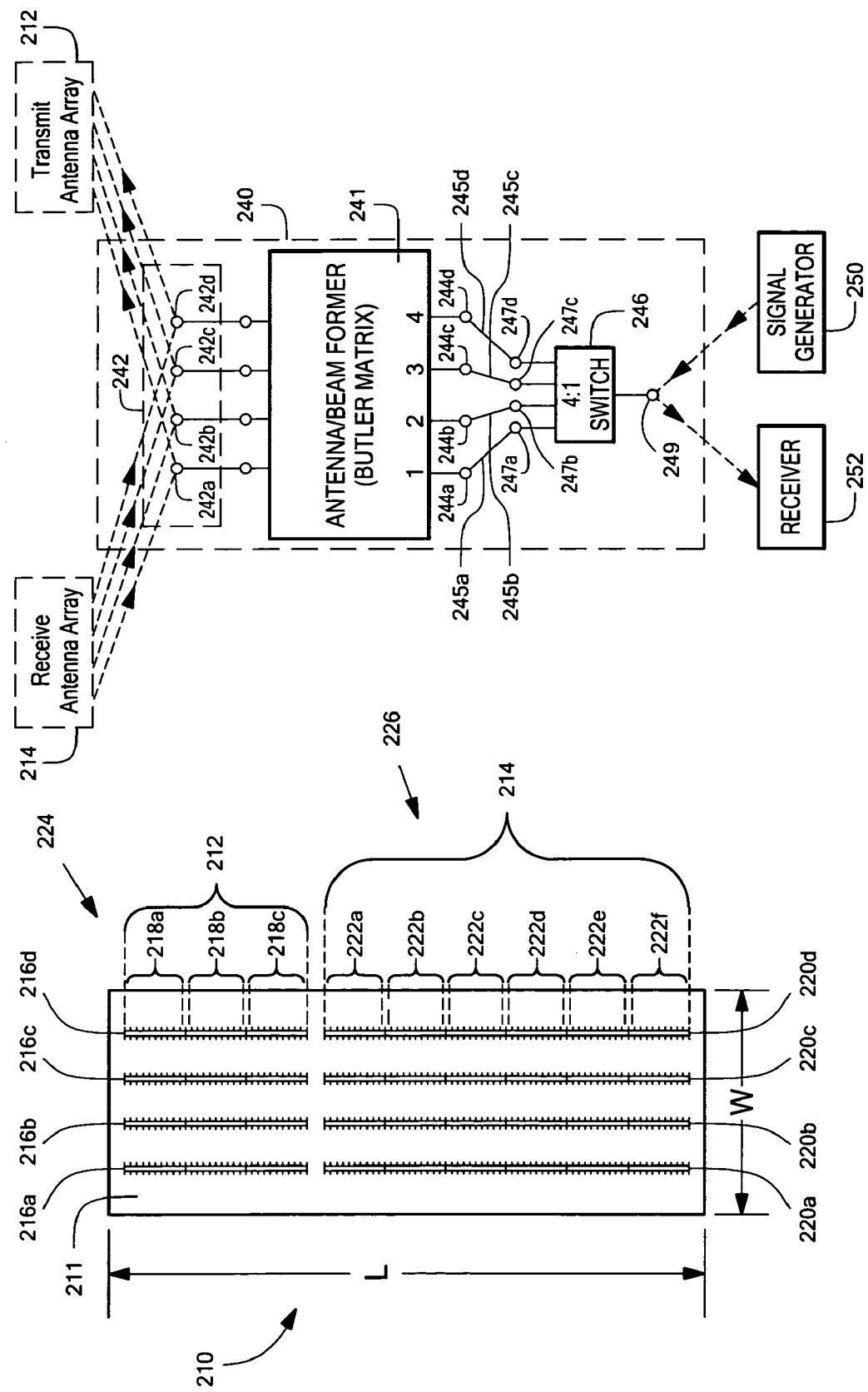

US 6,970,142 B1

ANTENNA CONFIGURATIONS FOR REDUCED RADAR COMPLEXITY

CROSS-REFERENCE TO RELATED APPLICATIONS

This application is a Continuation-in-Part of and claims the benefit of U.S. patent application Ser. No. 10/293,880, filed Nov. 13, 2002, which is a Continuation-in-Part of and claims the benefit of U.S. patent application Ser. No. 09/932,574, filed on Aug. 16, 2001, now U.S. Pat. No. 6,642,908, which are each hereby incorporated by reference.

STATEMENTS REGARDING FEDERALLY SPONSORED RESEARCH

Not applicable.

FIELD OF THE INVENTION

This invention relates to a transmit/receive system and more particularly to a transmit/receive system which utilizes an array antenna having asymmetric transmit and receive antennas.

BACKGROUND OF THE INVENTION

As is known in the art, there is an increasing trend to include radar systems in commercially available products. For example, it is desirable to include radar systems in automobiles, trucks boats, airplanes and other vehicle. Such radar systems must be compact and relatively low cost.

Furthermore, some applications have relatively difficult design parameters including restrictions on the physical size of the structure, as well as minimum operational performance requirements. Such competing design requirements make the design of such radar systems relatively challenging. Among the design challenges is the challenge to provide an antenna system which meets the design goals of being low cost, compact and have relatively high performance.

In automotive radar systems, for example, cost and size considerations are of considerable importance. Furthermore, in order to meet the performance requirements of automotive radar applications, (e.g. coverage area) an array antenna is required.

It would, therefore, be desirable to provide an antenna array that is compact which can operate in a high density circuit environment, and is relatively low cost to manufacture and yet provides an antenna array having relatively high performance characteristics.

SUMMARY OF THE INVENTION

In accordance with principles of the present invention, set forth is a transmit and receive system that is relatively compact and can operate in a high density circuit environment, and which is relatively low cost to manufacture and yet provides an antenna array having relatively high performance characteristics.

The transmit and receive system includes a first array having a first plurality of antenna elements disposed to provide a transmit antenna. The system further includes a second array having a second different plurality of antenna elements disposed to provide a receive antenna. A beam switching system can be coupled to the first array, which beam switching system is operative to selectively form at least one transmit beam. A beam combining system can be coupled to the second array, which beam combining system is operative to selectively form a plurality of receive beams.

In one aspect, the first array includes fewer antenna elements than the second array. Further, the first plurality of antenna elements are arranged into a transmit array including approximately four elements in azimuth and approximately three elements in elevation. In this arrangement, as well as in other arrangements, the transmit array includes approximately twelve elements. The second plurality of antenna elements are arranged into a receive array including approximately eight elements in azimuth and approximately six elements in elevation. In this arrangement, as well as in other arrangements, the receive array includes approximately forty-eight elements.

In another aspect, the second plurality of antenna elements are arranged into a receive array including approximately four elements in azimuth and approximately six elements in elevation. In this arrangement, as well as in other arrangements, the receive array includes approximately twenty-four elements.

In one aspect, the beam switching system includes a first beamforming circuit having a plurality of antenna ports and a plurality of switch ports. Each of the plurality of antenna ports are coupled to a corresponding one of the first plurality of antenna elements.

Furthermore, the beam switching system includes a first switched beam combining circuit having an input port and a plurality of output ports. Each of the plurality of output ports are coupled to a corresponding one of the plurality of switch ports of said first beamforming circuit. At least one attenuator can also be coupled to each one of the plurality of switch ports of the first beamforming circuit.

In one aspect, the beam combining system includes a second switched beamforming circuit having a plurality of switch ports and a plurality of output ports. Each of the plurality of antenna ports are coupled to a corresponding one of the second plurality of antenna elements. In addition, the beam combining system includes a switched beam combining system. The switched beam combining system includes a first switch having an output port and a plurality of input ports. Each of the plurality of input ports are coupled to respective first ones of the plurality of switch ports of the second beamforming circuit.

The switched beam combining system further includes a second switch having an output port and a plurality of input ports. Each of the plurality of input ports are coupled to respective second ones of the plurality of switch ports of the second beamforming circuit. Additionally, the switched beam combining system includes a power divider circuit having a first input coupled to the output port of the first switch, a second input coupled to the output port of the second switch and an output coupled to an output of said switched beam combining system. A receiver is further coupled to the output of said switched beam combining system.

In another aspect, the transmit and receive system includes a first array including at least one antenna element disposed to provide a transmit antenna. The transmit and receive system further includes a second array including a plurality of antenna elements disposed to provide a receive antenna. A beam switching system is coupled to the first array and is operative to form at least one transmit beam. A beam combining system is coupled to the second array and is operative to form a plurality of receive beams.

In one aspect, the first array includes fewer antenna elements than the second array. Further, the at least one antenna element of the first array is arranged to form a transmit array including approximately one antenna element in azimuth and approximately three antenna elements in elevation. In this arrangement, the transmit array includes approximately three antenna elements.

In one aspect, the plurality of antenna elements of the second array is arranged to form a receive array including approximately eight antenna elements in azimuth and approximately six antenna elements in elevation. In this arrangement, the receive array includes approximately forty-eight antenna elements.

The beam switching system includes a beamforming circuit having at least one antenna port coupled to the first array. In addition, the beamforming circuit includes at least one switch port coupled to a signal generator.

In one aspect, the beam switching system can include at least one transmit phase shifter that is constructed and arranged to phase shift the at least one transmit beam in a first predetermined direction. Similarly, the beam combining system can include at least one receive phase shifter that is constructed and arranged to phase shift the plurality of receive beams in a second predetermined direction. In one aspect, the at least one transmit beam is phase shifted in an opposite angular direction as the plurality of receive beams.

BRIEF DESCRIPTION OF THE DRAWINGS

The foregoing features of this invention, as well as the invention itself, may be more fully understood from the following description of the drawings in which:

FIG. 6 is a top plan view of an asymmetric antenna array in accordance with another embodiment of the present invention;

FIG. 7 is a block diagram of beam switching system and/or beam combining system adapted for coupling to the asymmetric antenna array, as shown in FIG. 6;

DETAILED DESCRIPTION OF THE INVENTION

Figure 1:
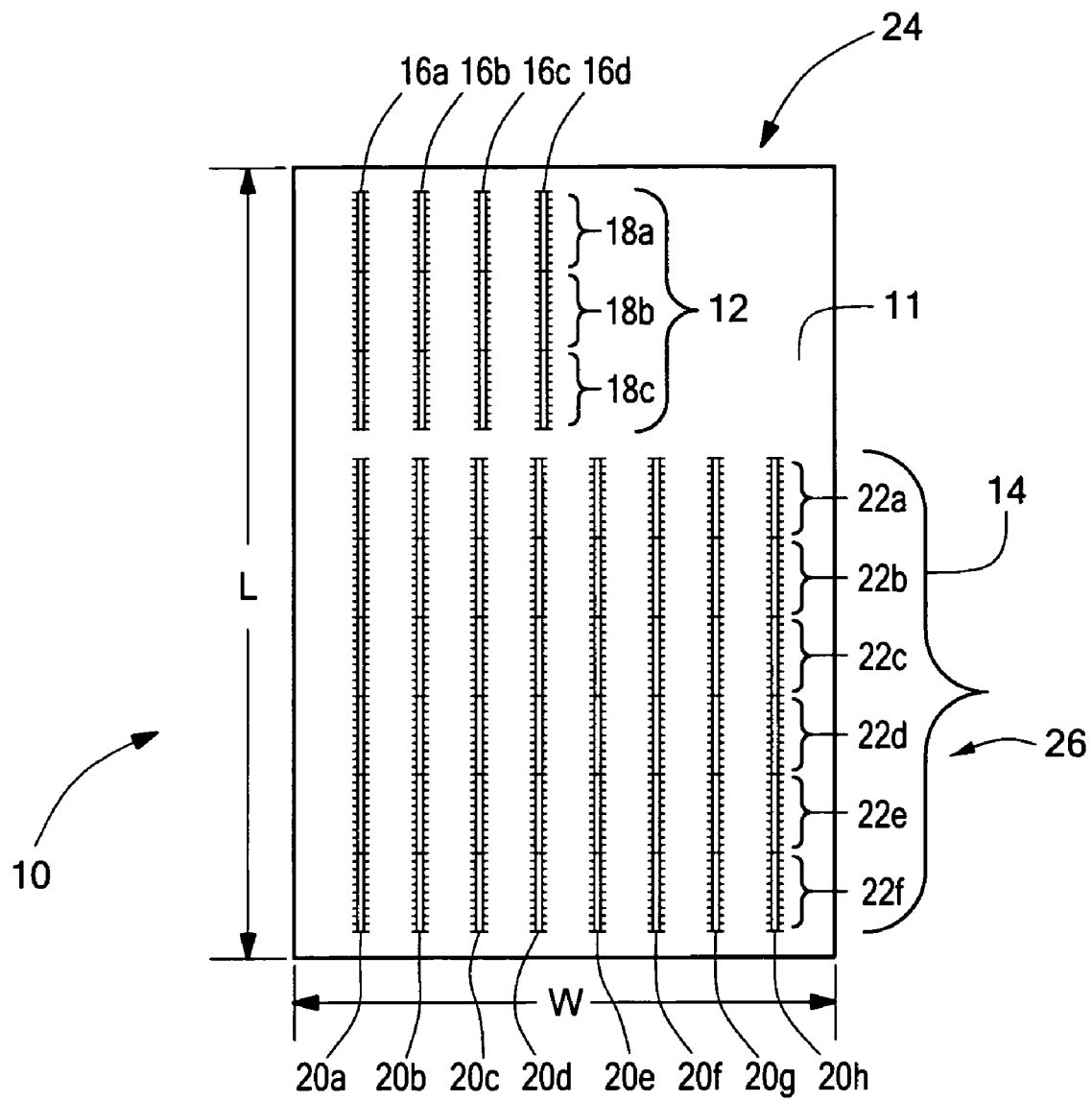
FIG. 1 is a top plan view of an asymmetric antenna array in accordance with an embodiment of the present invention.

Referring to FIG. 1, set forth is an asymmetric antenna array 10 provided from a substrate 11 having a length L and width W. The asymmetric antenna array 10 includes a first plurality of antenna elements disposed on the substrate 11 to provide a transmit antenna array 12 and a second plurality of antenna elements disposed on the substrate 11 to provide a receive antenna array 14. In one embodiment, the transmit antenna array 12 includes four rows 16a–16d and three columns 18a–18c and the receive antenna array 14 includes eight rows 20a–20h and six columns 22a–22f. Thus, the transmit antenna array 12 includes twelve radiating elements (or more simply "radiators" or "elements"), generally denoted 24, with four elements in azimuth and three elements in elevation. Additionally, the receive antenna array 14 includes forty-eight radiating elements (or more simply "radiators" or "elements"), generally denoted 26, with eight elements in azimuth and six elements in elevation.

It should be understood that a number of permutations of arrangements and quantities of radiators 24 can be disposed on the substrate 11 to define the transmit array 12 as long as the quantity of radiators 24 differs from the quantity of radiators 26 disposed on the substrate 11 to define the receive array 14. Similarly, it should be understood that a number of permutations of arrangements and quantities of radiators 26 can be disposed on the substrate 11 to define the receive array 14 as long as the quantity of radiators 26 differs from the quantity of radiators 24 disposed on the substrate 11 to define the transmit array 12. As will be described below in conjunction with FIGS. 2–5, the transmit array 12 is coupled to a transmit signal path and the receive array 14 is coupled to a receive signal path.

Figure 2:
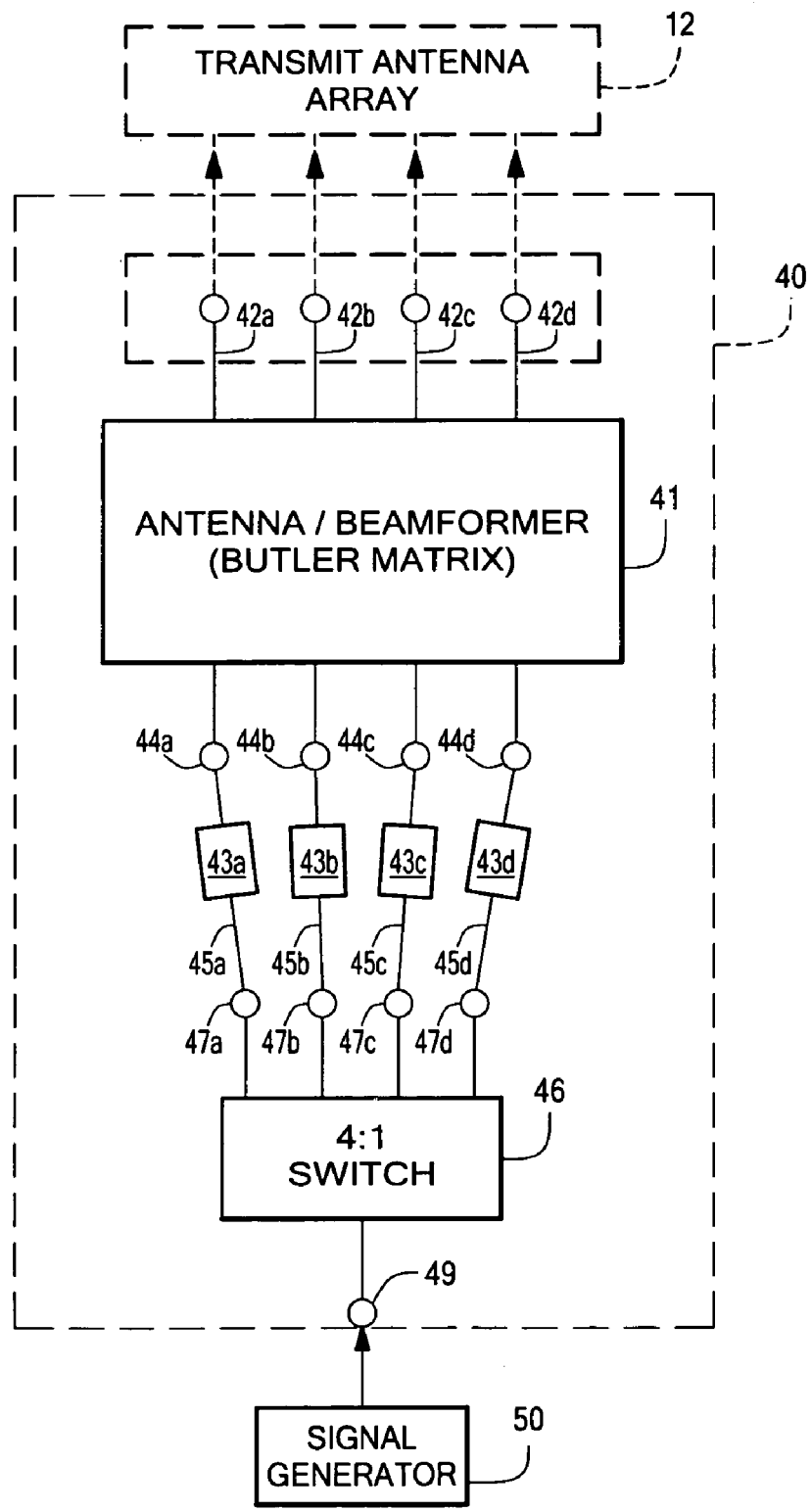
FIG. 2 is a block diagram of a beam switching system adapted for coupling to the asymmetric antenna array, as shown in FIG. 1.

Referring to FIG. 2, in the exemplary embodiment, a beam switching system 40 includes a beamformer circuit 41 which in this particular embodiment is shown as a Butler matrix beam forming network 41 having a plurality of antenna element ports 42a–42d generally denoted 42 and a plurality of switch ports 44a–44d. In an embodiment, the antenna element port 42 can be coupled to a transmit antenna array, such as the transmit antenna array 12 of FIG. 1, which is described in detail below.

The transmission lines 45a–45d respectively couple each of the switch ports 44a–44d of the beamformer circuit 41 to a switched beam combining circuit 46. Optionally, one, some or all of the transmission lines 45a–45d can include amplitude control elements 43a–43d which may be provided, for example, as an attenuator or as an amplifier. The amplitude control elements 43a–43d may be used for example, to control the signal levels in individual beams emitted from each of the corresponding antenna element ports 42a–42d, as described above. Although not shown in the figures, similar amplitude control elements can also be coupled between the beamformer circuit 41 and some or all of the antenna element ports 42a–42d, which provides additional control to the signal levels in individual beams emitted from each of the antenna element ports 42a–42d.

In the exemplary embodiment, the signal path between beamformer port 44a and switch port 47a includes an amplitude control element as does the signal path between beamformer port 44d and switch port 47d. In this arrangement, the signal levels in individual beams emitted from each of the antenna element ports 42a–42d will be substantially equivalent. In other words, the signal levels in individual beams emitted from each of the antenna element ports 42a–42d will include substantially equivalent radiant energy.

The switched beam combining circuit 46 is here provided from a single pole four throw switch 46 having a common port 49 coupled to the output port of the beam switching system 40. The common port 49 is coupled to a signal generator 50.

In one embodiment, each of the antenna element ports 42a–42d are coupled to corresponding ones of the four rows 16a–16d of the transmit antenna array 12, shown in FIG. 1. It should be understood that the plurality of antenna element ports 42a–42d of the antenna port 42 is scalable. Thus, in the event that an array antenna having more than four rows was used, it would be possible to make appropriate changes to the beamformer circuit to provide the beamformer circuit having an appropriate number of antenna ports 42.

Figure 3:
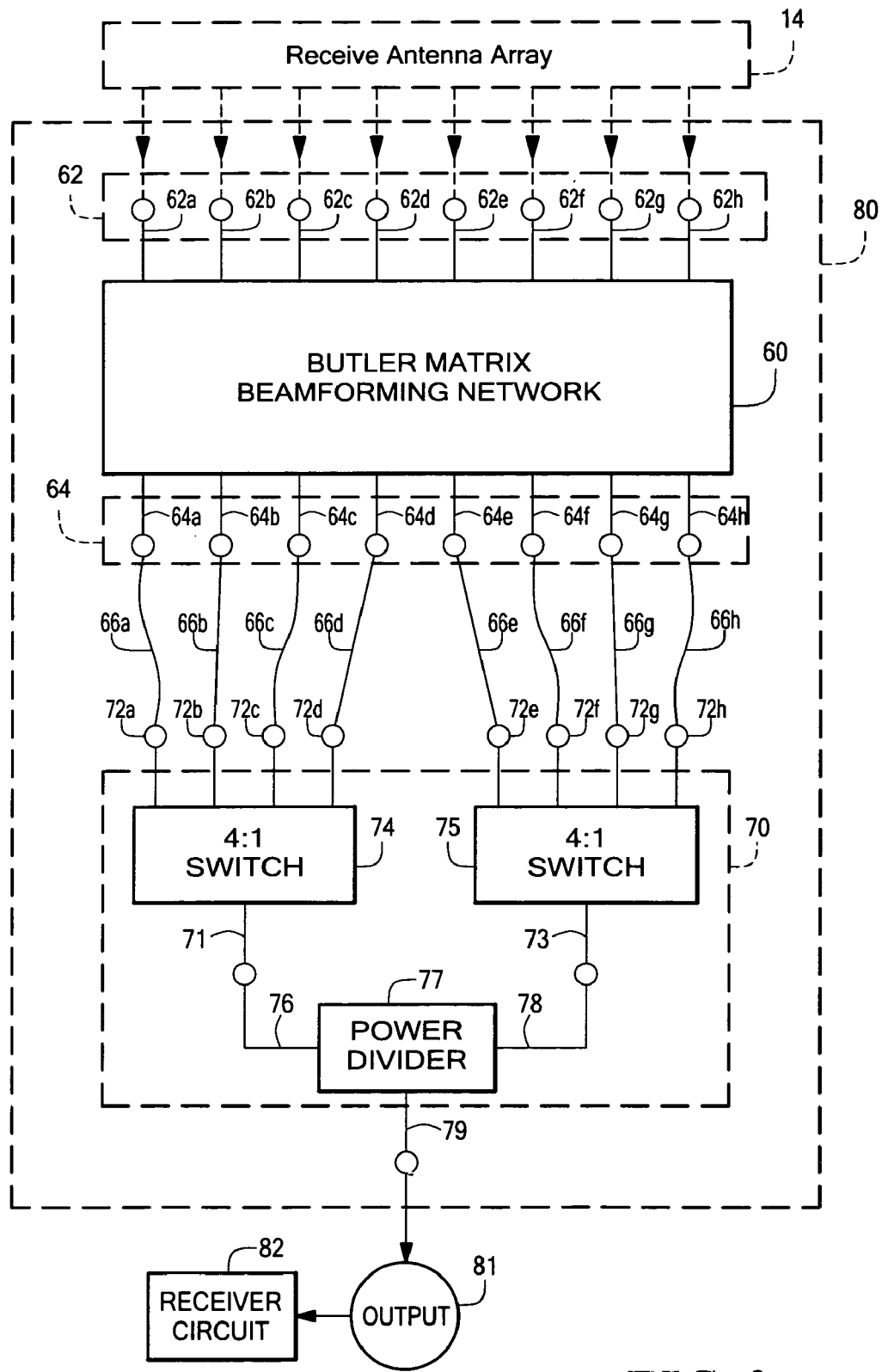
FIG. 3 is a block diagram of beam combining system adapted for coupling to the asymmetric antenna array, as shown in FIG. 1.

Referring now to FIG. 3, a beam combining system 80 includes a beamforming circuit 60 having a plurality of antenna element ports 62a–62h generally denoted 62 and a plurality of switch ports 64a–64h generally denoted 64. In this exemplary embodiment, the beamforming circuit 60 is shown as a Butler matrix beamforming network. In an embodiment, the antenna element port 62 can be coupled to a receive antenna array, such as the receive antenna arrant 14 of FIG. 1, which is described in detail below.

The switch ports 64 are coupled through transmission lines 66a–66h to a switched beam combining circuit 70. As is known, the port phasing for a Butler matrix have 180° phase difference and the curved signal paths 66a, 66c, 66f, 66h represent 180° differential line lengths required to bring all of the ports in phase with each other. The switched beam combining circuit 70 is here provided from a pair of single pole four throw switches 74, 75. Each of the switches 74, 75 include a common port 71, 73 coupled to respective output ports 76, 78 of a power divider circuit 77. The power divider circuit 77 is provided such that a signal fed to an input port 79 has an equal phase and power level at the output ports 76, 78. In this example, the port 79 is coupled to a receiver circuit 82, via an output port 81.

In one embodiment, the plurality of antenna element ports 62a–62h are coupled to corresponding ones of the rows 20a–20h of the receive antenna array 14, shown in FIG. 1. It should be understood that the plurality of antenna element ports 62a–62h of the antenna port 62 is scalable to accommodate a plurality of different receive antenna arrays (not shown) having a plurality of rows of radiators or elements.

Figure 4:
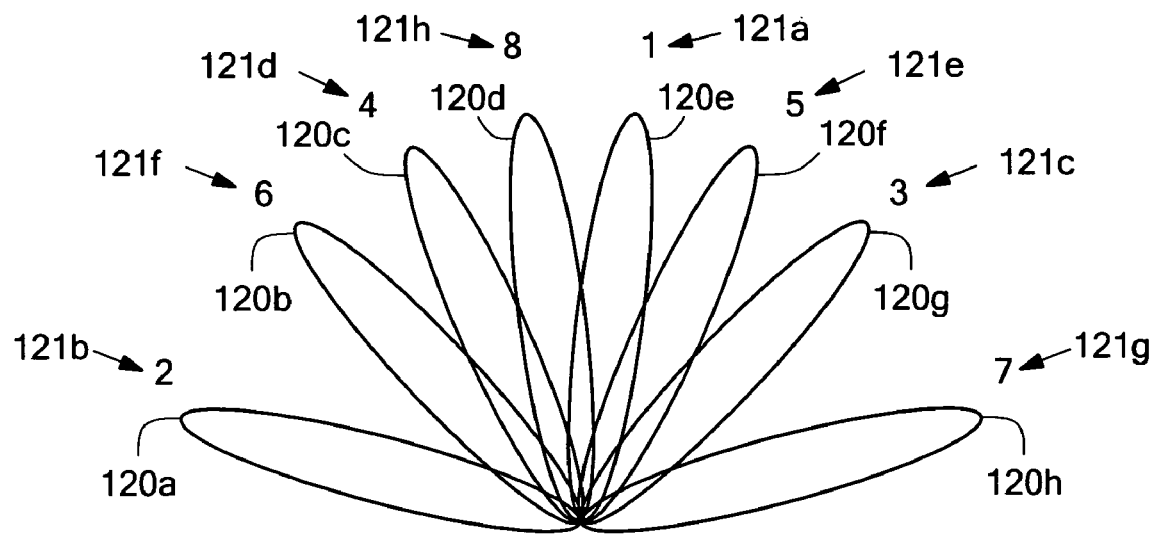
FIG. 4 is an illustration of a plurality of beams generated by a Butler Matrix circuit of the beam combining system of FIG. 3.

Referring to FIG. 4, in this particular embodiment, the Butler beamforming circuit 60 (FIG. 3) forms eight beams 120a–120h. That is, by providing an input signal to one of the plurality of antenna ports 62 of the Butler matrix 60, which input signal is provided from the receive antenna 26, the Butler matrix 60 generates a corresponding one of the beams 120a–120h at a corresponding one of the plurality of switch ports 64 thereof. The calculations for determining the beam locations can be found using the equations below:

$$\text{Wavelength (inches): } \lambda := \frac{11.81}{24}$$

Number of Elements: N:=8
Element Spacing (Azimuth): d:=0.223
Beam Location (Degrees):

$$\text{beamloc}(M) := \text{asin}\left[\frac{\lambda}{N \cdot d} \cdot \left(M - \frac{1}{2}\right)\right] \cdot \frac{180}{\pi}$$

Beam Number:

$$M := 1 - \frac{N}{2}$$

If the array is provided having an array lattice spacing of 0.223" in azimuth, the beam locations shown in FIG. 4 are provided. In one embodiment, the differential line length value, n is selected to be ¹⁄₁₆ λ) which corresponds to 0.0127 inch at a frequency of 24 GHz. FIG. 7 also illustrates which beam-ports in FIG. 6 produce which beams.

Figure 4A:
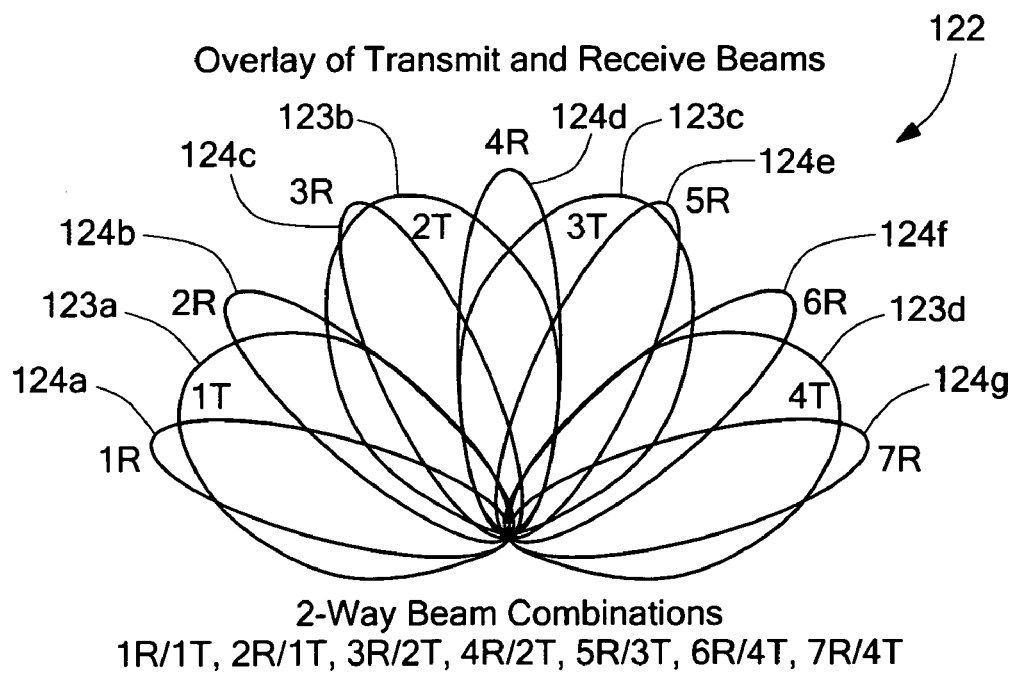
FIG. 4A is an illustration of an overlay of a plurality of receive beams generated by the beam combining system of FIG. 3 and a plurality of transmit beams generated by the beam switching system of FIG. 2.

Referring now to FIG. 4A, a calculated antenna radiation pattern 122 includes four transmit beams 123a–123d and seven receive beams 124a–124g which can be used in a radar system. The four transmit beams are formed by feeding a transmit signal produced by signal source 50 (FIG. 2) through the switch 46. Depending upon the switch path which is selected, a signal is provided to one of the Butler matrix ports 44a–44d (FIG. 2). The Butler beamforming circuit 40 then forms one of the four transmit antenna beams 123a–123d. That is, by providing an input signal to one of the Butler matrix input ports 44a–44d (FIG. 2), the transmit antenna 12 (FIG. 1) produces a corresponding one of the beams 123a–123d.

The seven receive beams 124a–124g are provided by combining predetermined ones of the eight beams 120a–120h (FIG. 4) formed by the Butler Matrix 60 (FIG. 3) as discussed above. Adjacent beams (e.g. beams 120a, 120b from FIG. 4) can be combined to produce beam 124a as illustrated in FIG. 4A. Since beams out of a Butler Matrix by definition are orthogonal, combining beams in azimuth produces a cos(θ) taper with a peak sidelobe level of 23 dB (with respect to the beam maximum).

The locations of the combined received beams are listed in the Table below.

TABLE

| Combined Beam | Beam Location |
|---|---|
| 8,1 | 0 |
| 4,8 & 1,5 | +/−16 |
| 6,4 & 5,3 | +/−34 |
| 2,6 & 3,7 | +/−57 |

In elevation, there is also a 25 dB Chebyshev taper and a 15° beam steer.

Figure 5:
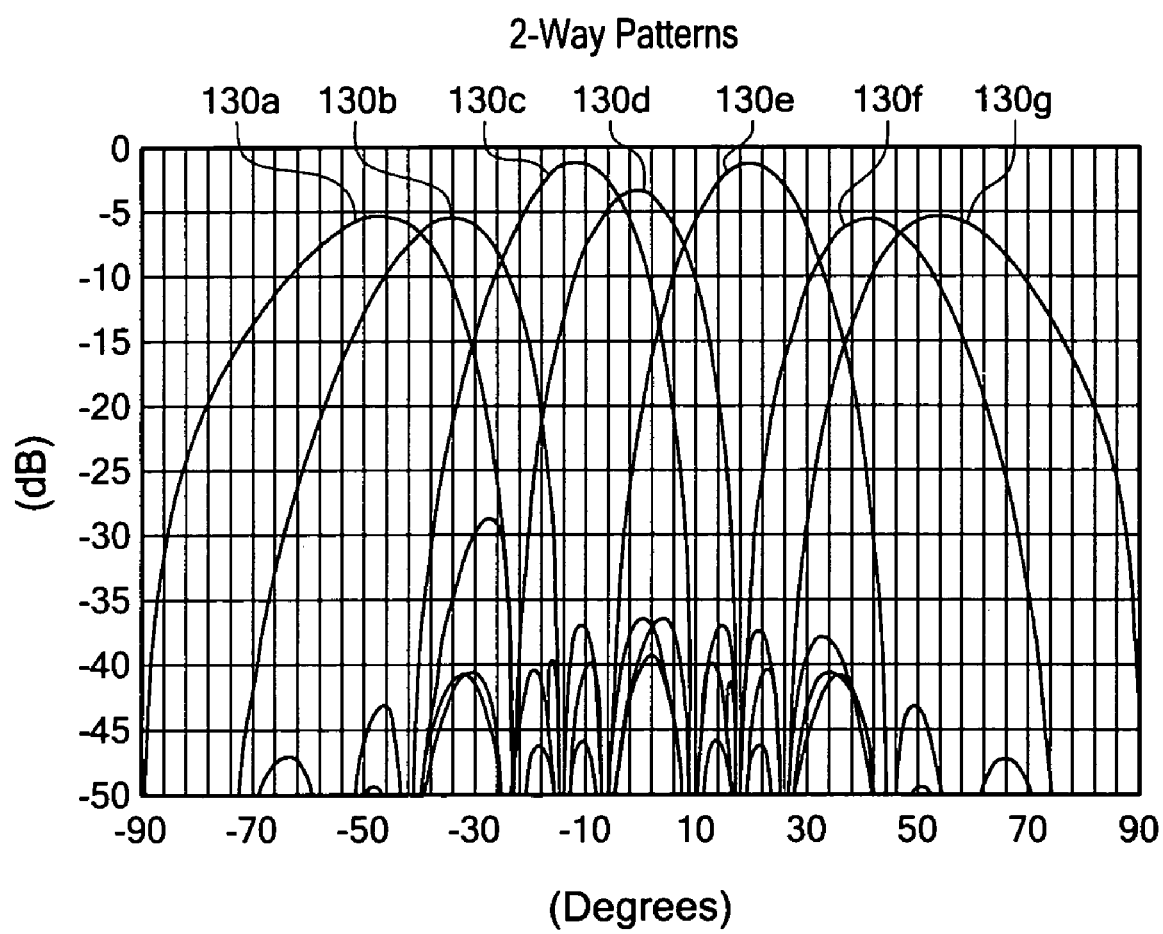
FIG. 5 is a graph illustrating radiation patterns associated with the plurality of receive beams generated by the beam combining system of FIG. 3.

Referring to FIG. 5, a two-way radiation pattern having seven antenna beams 130a–130g is produced by an array antenna having an array of antenna elements provided as described above in conjunction with FIG. 1 and having the transmit array 12 coupled to a transmit path of the type described above in conjunction with FIG. 2 and having the receive array 14 coupled to a receive path of the type described above in conjunction with FIG. 3.

Referring to FIG. 6, set forth is another embodiment of an asymmetric antenna array 210 in accordance with the present invention. The asymmetric antenna array 210 can be disposed on a substrate 211 having a length L and width W. The asymmetric antenna array 210 includes a first plurality of antenna elements disposed on the substrate 211 to provide a transmit antenna array 212 and a second plurality of antenna elements disposed on the substrate 211 to provide a receive antenna array 214. In one embodiment, the transmit antenna array 212 includes four rows 216a–216d and three columns 218a–218c and the receive antenna array 214 includes four rows 220a–220d and six columns 222a–222f. Thus, the transmit antenna array 212 includes twelve radiating elements (or more simply "radiators" or "elements"), generally denoted 224, with four elements in azimuth and three elements in elevation. Additionally, the receive antenna array 214 includes twenty-four radiating elements (or more simply "radiators" or "elements"), generally denoted 226, with four elements in azimuth and six elements in elevation.

It should be understood that a number of permutations of arrangements and quantities of radiators 224 can be disposed on the substrate 211 to define the transmit array 212 as long as the quantity of radiators 224 differs from the quantity of radiators 226 disposed on the substrate 211 to define the receive array 214. Similarly, it should be understood that a number of permutations of arrangements and quantities of radiators 226 can be disposed on the substrate 211 to define the receive array 214 as long as the quantity of radiators 226 differs from the quantity of radiators 224 disposed on the substrate 211 to define the transmit array 212.

Referring to FIG. 7, in the exemplary embodiment, a beam switching system 240 includes a beamformer circuit 241, which in this particular embodiment is shown as a Butler matrix beam forming network 241 having a plurality of antenna element ports 242a–242d generally denoted 242 and a plurality of switch ports 244a–244d. In one embodiment, the antenna element port 242 can be coupled to a transmit antenna array, such as the transmit antenna array 212 of FIG. 6 (e.g. beam switching system 240 is employed to transmit signals to the transmit antenna array 212, via the antenna element port 242), which is described in detail below. In another embodiment, the antenna element port 242 can be coupled to a receive antenna array, such as the receive antenna array 214 of FIG. 6 (e.g. beam switching system 240 is employed to receive signals from the receive antenna array 214, via the antenna element port 242), which is also described in detail below.

The transmission lines 245a–245d couple each of the switch ports 244a–244d to a switched beam combining circuit 246. Optionally, one, some or all of the transmission lines 245a–245d can include an amplitude control element, which is similar to that shown and described above in connection with FIG. 2. In the exemplary embodiment, the signal path between beamformer port 244a and switch port 247a includes an amplitude control element as does the signal path between beamformer port 244d and switch port 247d.

The switched beam combining circuit 246 is here provided from a single pole four throw switch 246 having a common port 249 coupled to the output port of the beam switching system 240. The common port 249 can be coupled to a signal generator 250 when the beam switching system 240 is employed to transmit a plurality of signal to the transmit antenna 224 (FIG. 6), via the antenna port 242. In an embodiment, each of the antenna element ports 242a–242d are coupled to corresponding ones of the four rows 216a–216d of the transmit antenna array 212, as shown in FIG. 6. It should be understood that the plurality of antenna element ports 242a–242d of the antenna port 242 is scalable. Thus, in the event that a transmit array antenna 212 having more than four rows was used, it would be possible to make appropriate changes to the beamformer circuit 241 of the beam switching system 240 to provide the beamformer circuit 241 having an appropriate number of antenna ports 242.

In addition, it should be understood that a beam combining system (not shown) can be similarly constructed and arranged as the beam switching system 240. Therefore, for illustrative purposes, the beam switching system 240 can be redefined as the beam combining system 240, where like components are referred to using like reference designations. The beam combing system 240 includes a signal receiver circuit 252 coupled to the common output port 249 of the switch 246. In an embodiment, each of the antenna element ports 242a–242d are coupled to corresponding ones of the four rows 220a–220d of the receive antenna array 214, shown in FIG. 6. It should be understood that the plurality of antenna element ports 242a–242d of the antenna port 242 is scalable. Thus, in the event that a receive array antenna 214 having more than four rows was used, it would be possible to make appropriate changes to the beamformer circuit 241 of the beam combining circuit 240 to provide the beamformer circuit 241 having an appropriate number of antenna ports 242.

Figure 7A:
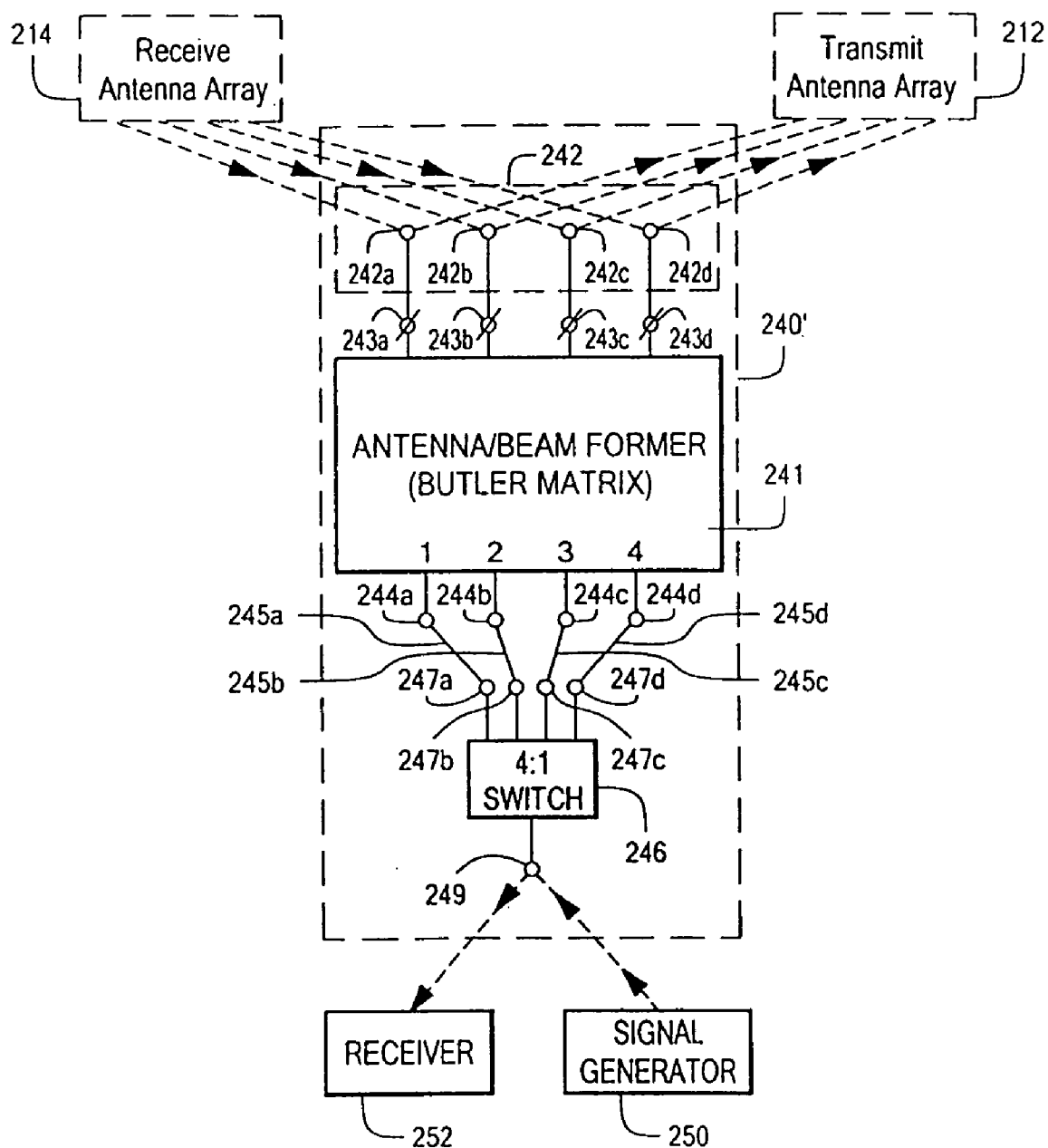
FIG. 7A is a block diagram of another embodiment of the beam switching system and/or beam combining system adapted for coupling to the asymmetric antenna array, as shown in FIG. 6.

Referring to FIG. 7A, shown is another exemplary embodiment of a beam switching system and/or beam combining system 240', which is similarly constructed and arranged as the beam switching system and/or beam combining system 240, as shown and described above with respect to FIG. 7, where like components are referred to using like reference designations. In FIG. 7A, the beam switching system and/or beam combining system 240' further includes a number of phase shifters 243a, 243b, 243c and 243d, which are coupled between each of the respective antenna element ports 242a, 242b, 242c and 242d and the beamformer circuit 241.

During transmission of signals from the signal generator 250 through the beam switching system and/or beam combining system 240' to the transmit antenna array 212 (FIG. 6), via the antenna element ports 242a, 242b, 242c and 242d, each of the corresponding phase shifters 243a, 243b, 243c and 243d introduce a predetermined phase shift to the transmitted signal, which introduces a corresponding phase shift or "squint" to the antenna beam signal emitted from the transmit antenna array 212. In one embodiment, the phase shifters 243a, 243b, 243c and 243d can be constructed and arranged to introduce a phase shift or squint to the antenna beam emitted from the transmit antenna array 212 of approximately one-half a beam width in a first predetermined direction (e.g. to the left).

Similarly, when the antenna receives a signal (e.g. receive antenna array 214 on FIG. 6 receives a signal), the signal is fed to ports 242a–242d and subsequently propagates through phase shifters 243a, 243b, 243c and 243d. The phase shifters 243a–243d introduce a predetermined phase shift to the received signal, which introduces a corresponding shift or squint to the positions of the receive antenna beams produced by the receive antenna array. In one embodiment, the phase shifters 243a, 243b, 243c and 243d can be constructed and arranged to introduce a shift or squint to the antenna beam signal received from the receive antenna array 214 of approximately one-half a beam width in a second predetermined direction (e.g. to the right).

Figure 8:
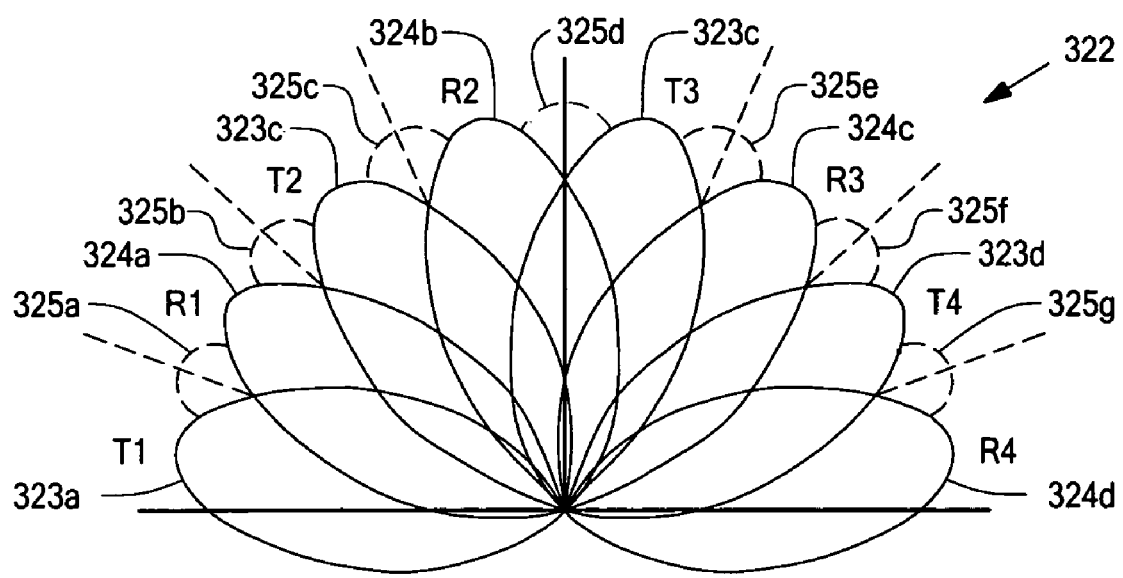
FIG. 8 is an illustration of an overlay of a plurality of receive beams and a plurality of transmit beams generated by the beam switching system and/or beam combining system of FIG. 7.

Referring to FIG. 8, shown is an overlay 322 (illustration does not depict actual beam shapes and locations) and combination of transmit beams 323a–323d and receive beams 324a–324d, which operate to form the seven two-way beams 325a–325g, as described herein. In the exemplary embodiment, the transmit beams 323a–323d and receive beams 324a–324d are squinted or phase-shifted approximately one-half a beam width in opposite direction with respect to each other. Furthermore, adjacent transmit beams 323a–323d and receive beams 324a–324d can be combined to form the seven two-way beams 325a–325g.

In an embodiment, the transmit beam 323a can be combined with receive beam 324a to form two-way beam 325a. Further, the transmit beam 323b can be combined with receive beam 324a to form two-way beam 325b. The transmit beam 323b can be combined with receive beam 324b to form two-way beam 325c. The transmit beam 323c can be combined with receive beam 324b to form two-way beam 325d. The transmit beam 323c can be combined with receive beam 324c to form two-way beam 325e. The transmit beam 323d can be combined with receive beam 324c to form two-way beam 325f. Finally, the transmit beam 323d can be combined with receive beam 324d to form two-way beam 325g.

Figure 9:
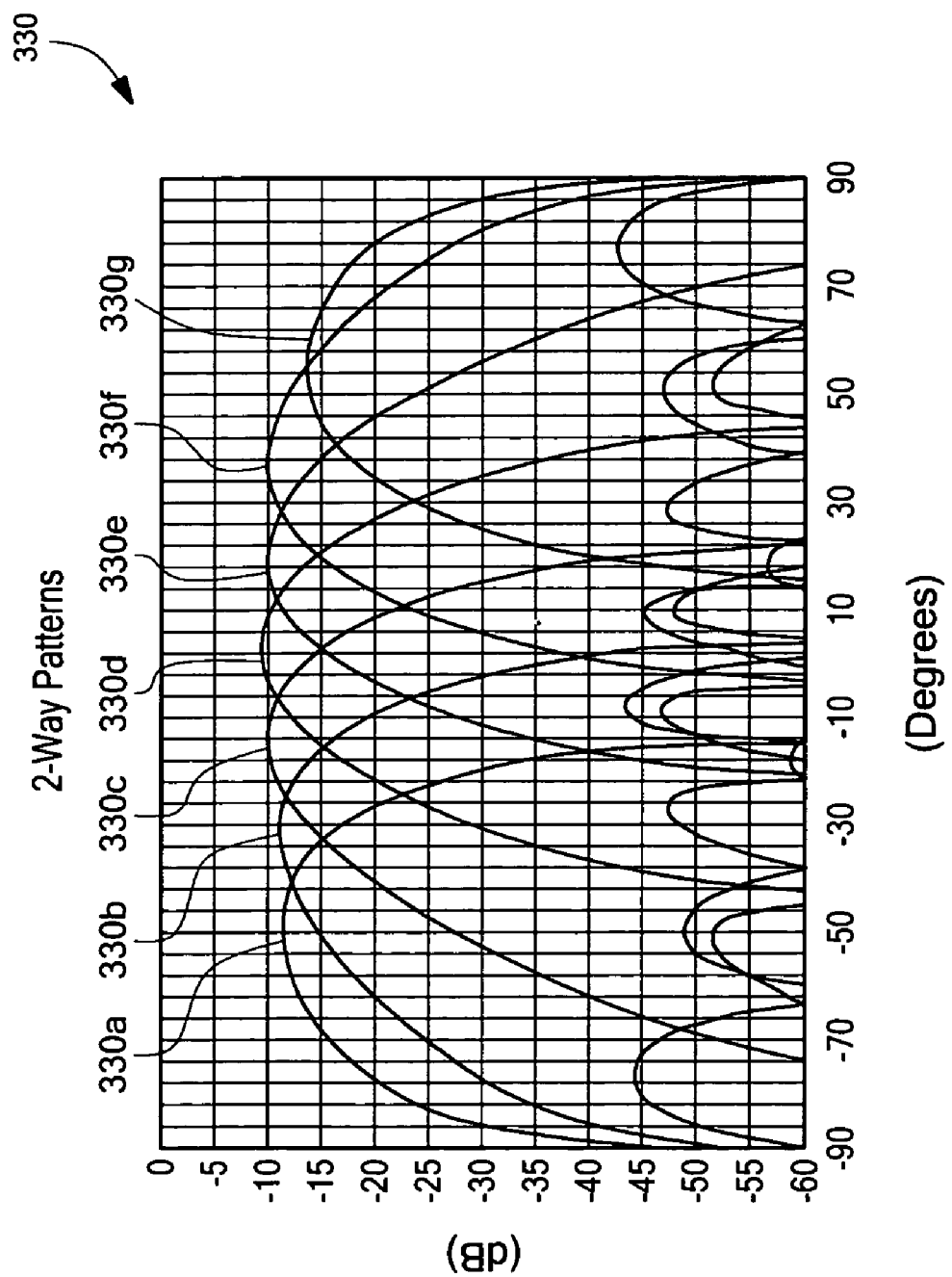
FIG. 9 is a graph illustrating radiation patterns associated with the plurality of receive beams generated by the beam switching system and/or beam combining system of FIG. 7.

Referring to FIG. 9, a two-way radiation pattern having seven antenna beams 330a–330g is produced by an array antenna having an array of antenna elements provided as described above in conjunction with FIG. 6 and having the transmit antenna array 212 and the receive antenna array 214 coupled to a transmit and/or receive path of the type described above in conjunction with FIG. 7. FIG. 9 shows a typical two-way antenna radiation pattern 330 corresponding to the seven two-way beams 325a–325g, as shown in FIG. 8. The number of beams and beam coverage are substantially the same as that shown and described above with respect to FIG. 5. The side-lobe levels associated with each of the seven two-way beams 330a–330g are approximately below the 40 dB level. Further, it should be recognized that any loss in transmit gain or receive sensitivity is relatively insignificant and does not necessitate amplification using additional amplifiers. In addition, it should also be recognized that even though the seven two-way beams 330a–330g include slightly broader beamwidths than the seven two-way beams 130a–130g of FIG. 5, which affects the degree to which the detection coverage zone can be shaped, the seven two-way beams 330a–330g remain particularly useful in radar system applications.

Figure 10:
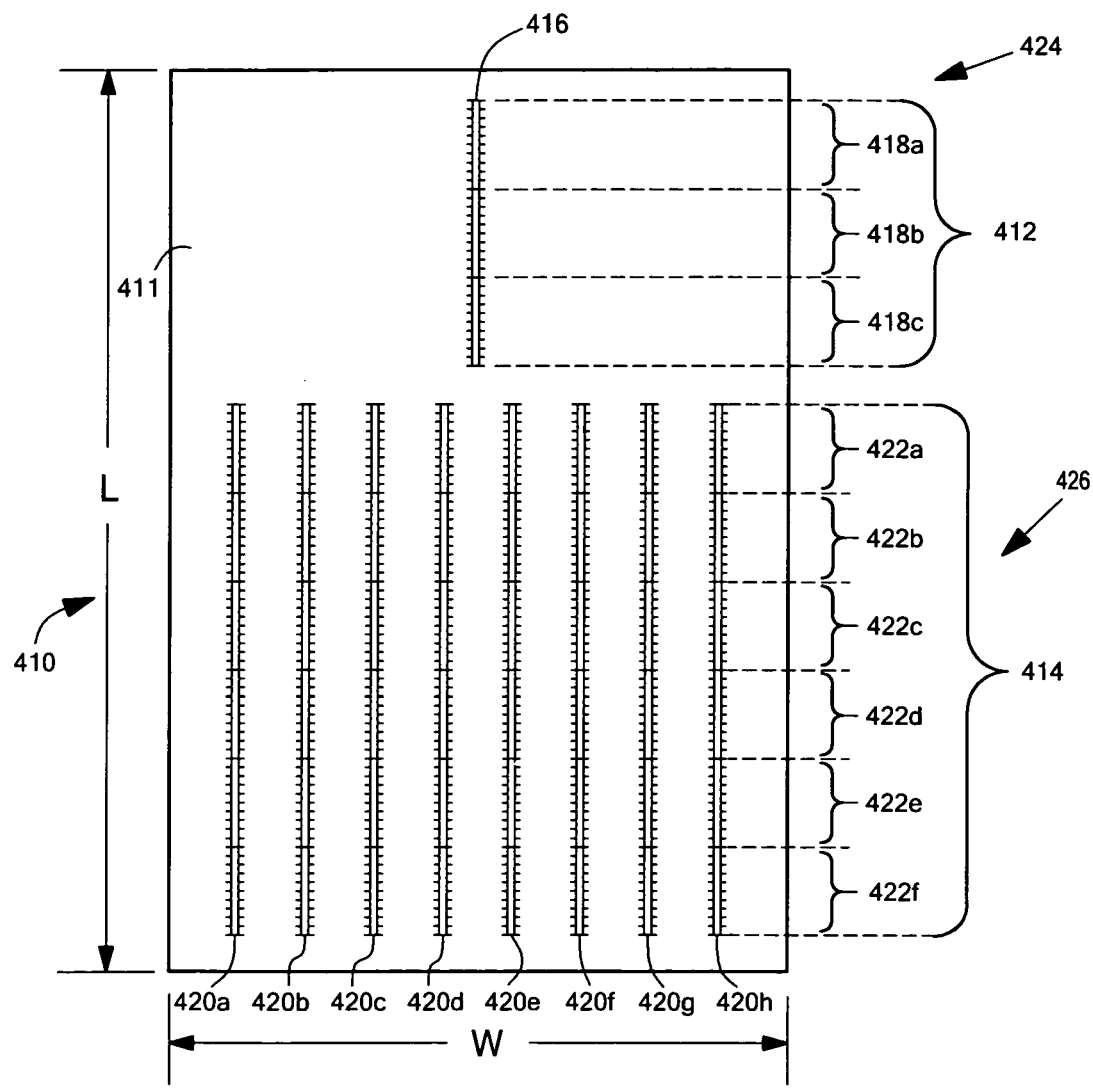
FIG. 10 is a top plan view of an asymmetric antenna array in accordance with another embodiment of the present invention.

Referring to FIG. 10, set forth is another embodiment of an asymmetric antenna array 410 in accordance with the present invention. The asymmetric antenna array 410 can be disposed on a substrate 411 having a length L and width W. The asymmetric antenna array 410 includes a first plurality of antenna elements disposed on the substrate 411 to provide a transmit antenna array 412 and a second plurality of antenna elements disposed on the substrate 411 to provide a receive antenna array 414. In one embodiment, the transmit antenna array 412 includes one row 416 and three columns 418a–418c and the receive antenna array 414 includes eight rows 420a–420h and six columns 422a–422f. Although the respective row(s) and columns of the transmit antenna array 412 and the receive antenna array 414 have been respectively disclosed as being vertically oriented and horizontally oriented, it should be understood that these definitions can be modified to re-define the vertically oriented radiators as columns and the horizontally oriented radiators as rows.

In an embodiment, the transmit antenna array 412 includes three radiating elements (or more simply "radiators" or "elements"), generally denoted 424, with one element in azimuth and three elements in elevation. Additionally, the receive antenna array 414 includes forty-eight radiating elements, generally denoted 426, with eight elements in azimuth and six elements in elevation.

Although not specifically shown, it should be understood that the transmit antenna array 412 can include one row 416 and one column, such as column 418a. Thus, the transmit antenna array 412 can include a single radiating element (or more simply "radiator" or "element"), generally denoted 424, with one element in azimuth and one elements in elevation.

It should also be understood that a number of permutations of arrangements and quantities of radiators 424 can be disposed on the substrate 411 to define the transmit array 412 as long as the quantity of radiators 424 which define the transmit array differs from the quantity of radiators 426 which define the receive antenna array 414. Similarly, it should be understood that a number of permutations of arrangements and quantities of radiators 426 which define the receive array 414 as long as the quantity of radiators 426 differs from the quantity of radiators 424 which define the transmit array 412.

Figure 11:
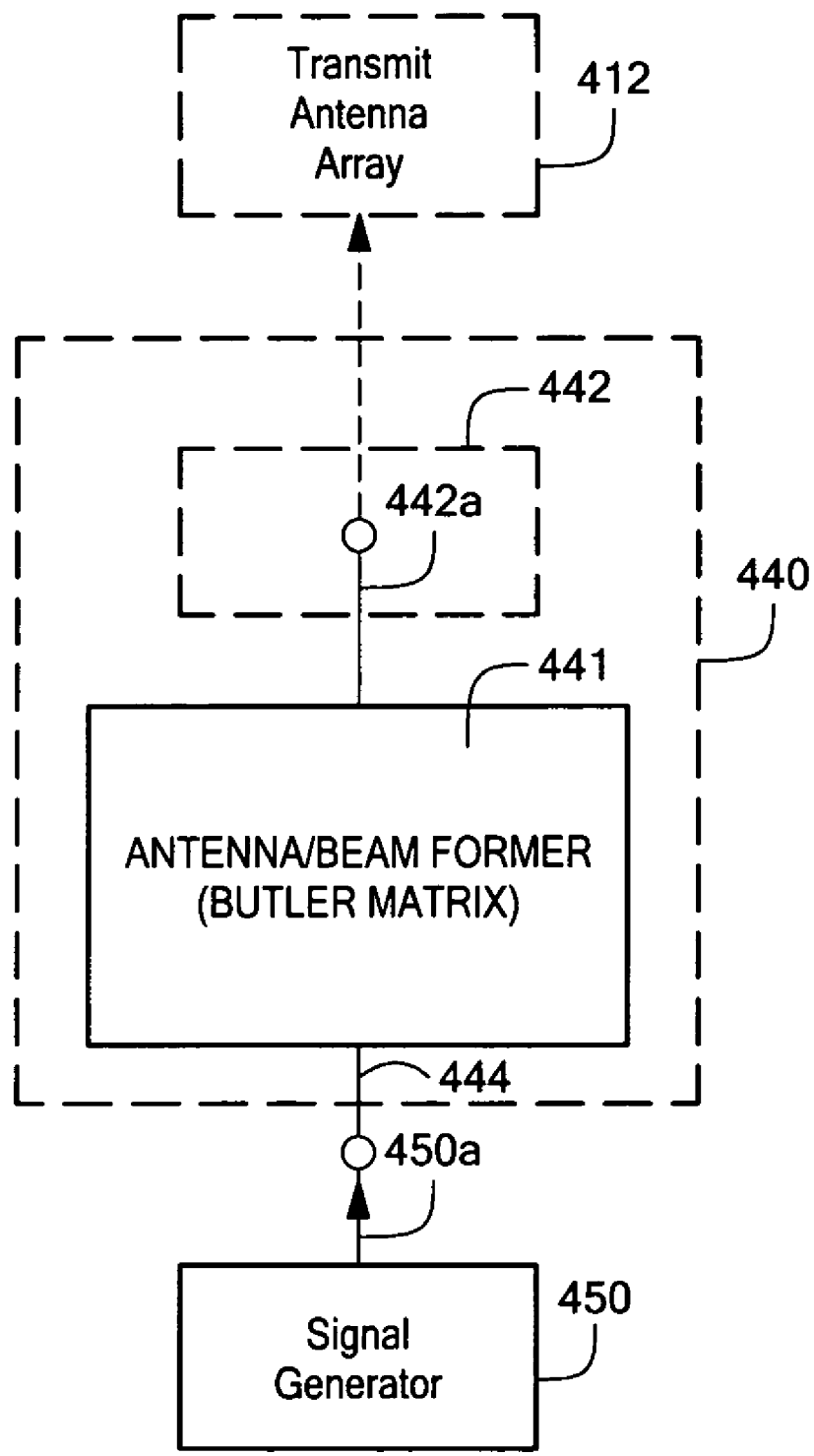
FIG. 11 is a block diagram of beam switching system adapted for coupling to the asymmetric antenna array, as shown in FIG. 10.

Referring to FIG. 11, in the exemplary embodiment, a beam switching system 440 includes a beamformer circuit 441, which in this particular embodiment is shown as a Butler matrix beam forming network 441 having at least one antenna element port 442a and at least one switch port 444. In the exemplary embodiment, the antenna port 442 is coupled to the row 416 of the transmit antenna array 412, as shown in FIG. 10. Further, the switch port 444 is coupled to an output 450a of a signal generator 450. It should be understood that the at least one antenna element 442a of the antenna port 442 is scalable. Thus, in the event that a transmit antenna array 412 having more than one row was used, it would be possible to make appropriate changes to the beamformer circuit 441 of the beam switching system 440 to provide the beamformer circuit 441 having an appropriate number of antenna ports 442.

Referring again to FIG. 3, the beam combining system 80 can be similarly coupled to the receive antenna array 414 of FIG. 10 as that previously shown and described above for coupling the beam combining system 80 to the receive antenna 26 of FIG. 3. Thus, a plurality of signals received by the receive antenna array 414 of FIG. 10 can be realized at the receiver circuit 82, via the output 81, as shown in FIG. 3.

Figure 12:
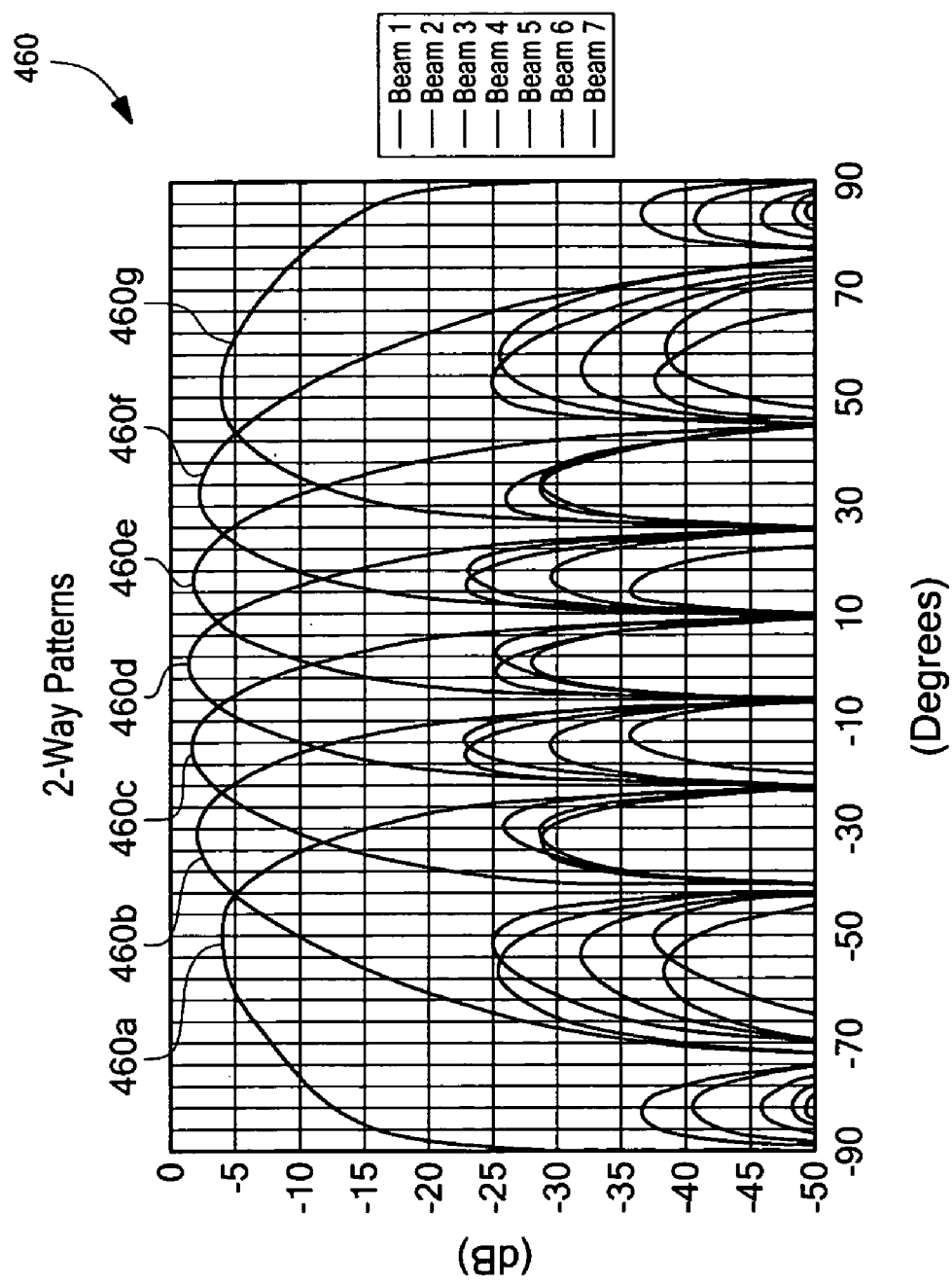
FIG. 12 is a graph illustrating radiation patterns associated with the plurality of receive beams generated by the beam combining system of FIG. 3, which is adapted for coupling to the asymmetric antenna array, as shown in FIG. 10.

Referring to FIG. 12, a two-way radiation pattern having seven antenna beams 460a–460g is produced by an array antenna having an array of antenna elements as described above in conjunction with FIG. 10. The side-lobe levels associated with each of the seven two-way beams 460a–460g are approximately below the 20 dB level. In the exemplary embodiment, it should be understood that an increase in the transmit energy or power provided to the transmit antenna can increase the system performance. Thus, transmit energy or power provided to the transmit antenna can be controlled to accommodate a particular application for the asymmetric antenna array, while at the same time providing a cost efficient asymmetric antenna array.

Although not specifically shown, it should be understood that the asymmetric antenna arrays 10, 210 and 410 respectively shown in FIGS. 1, 6 and 10, can each be substituted with a plurality of other types of antenna arrays having a plurality of other types of radiators arranged in a plurality of configurations without departing from the spirit and scope of the present invention.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A transmit and receive system comprising:
   a first array including at least one antenna element disposed to provide a transmit antenna;
   a second array including a plurality of antenna elements disposed to provide a receive antenna;
   a beam switching system coupled to the first array and being operative to form at least one transmit beam; and
   a beam combining system coupled to the second array and being operative to form a plurality of receive beams, wherein the first array includes fewer antenna elements than the second array.

2. The system of claim 1 wherein the receive array includes forty-eight elements.

3. The system of claim 1 further comprising a signal generator and wherein the beam switching system includes a beamforming circuit having at least one antenna port coupled to the first array and at least one switch port coupled to the signal generator.

4. The system of claim 3 wherein the receive array includes forty-eight elements.

5. The system of claim 1 wherein the transmit array includes three elements in an elevation plane.

6. A transmit and receive system comprising:
   a first array including at least one antenna element disposed to provide a transmit antenna, wherein the at least one antenna element is arranged into a transmit array including approximately one element in azimuth and approximately three elements in elevation;
   a second array including a plurality of antenna elements disposed to provide a receive antenna;
   a beam switching system coupled to the first array and being operative to form at least one transmit beam; and
   a beam combining system coupled to the second array and being operative to form a plurality of receive beams.

7. The system of claim 6, wherein the transmit array includes three elements.

8. The system of claim 6 further comprising a signal generator and wherein the beam switching system includes a beamforming circuit having at least one antenna port coupled to the first array and at least one switch port coupled to the signal generator.

9. The system of claim 6 wherein the receive array includes forty-eight elements.

10. The system of claim 9 wherein the transmit array includes three elements in an elevation plane.

11. A transmit and receive system comprising:
    a first array including at least one antenna element disposed to provide a transmit antenna;
    a second array including a plurality of antenna elements disposed to provide a receive antenna, wherein the plurality of antenna elements are arranged into a receive array including approximately eight elements in azimuth and approximately six elements in elevation;
    a beam switching system coupled to the first array and being operative to form at least one transmit beam; and
    a beam combining system coupled to the second array and being operative to form a plurality of receive beams.

12. The system of claim 11, wherein the receive array includes approximately forty-eight elements.

13. The system of claim 11, wherein the beam switching system includes a beamforming circuit having at least one antenna port coupled to the first array.

14. The system of claim 13, wherein the beamforming circuit further includes at least one switch port coupled to a signal generator.

* * * * *

UNITED STATES PATENT AND TRADEMARK OFFICE
CERTIFICATE OF CORRECTION

PATENT NO. : 6,970,142 B1  
APPLICATION NO. : 10/376179  
DATED : November 29, 2005  
INVENTOR(S) : Pleva et al.

Page 1 of 1

It is certified that error appears in the above-identified patent and that said Letters Patent is hereby corrected as shown below:

Column 1, line 31 delete "trucks boats, airplanes and other vehicle." and replace with --trucks, boats, airplanes and other vehicles.--.

Column 3, line 35 delete "of beam combining" and replace with --of a beam combining--.

Column 3, line 51 delete "of beam switching" and replace with --of a beam switching--.

Column 4, line 1 delete "of beam switching" and replace with --of a beam switching--.

Column 5, line 35 delete "the receive antenna arrant 14" and replace with --the receive antenna array 14--.

Column6, line 27 delete "1/16 λ) which" and replace with --1/16 λ which--.

Column 6, line 29 delete "beam-ports" and replace with --beam ports--.

Column 8, line 21 delete "combing" and replace with --combining--.

Column 10, line 16 delete "one elements" and replace with --one element--.

Signed and Sealed this

Thirteenth Day of November, 2007

JON W. DUDAS  
*Director of the United States Patent and Trademark Office*